United States Patent [19]
Jörn et al.

[11] 3,759,064
[45] Sept. 18, 1973

[54] COMPOSITE FLEXIBLE COUPLING FOR INTERCONNECTING TWO SHAFTS

[76] Inventors: Raoul Jörn, D-8992 Hengnau; Peter Reichardt, Grasinger Rain 4, D-7012 Fellbach

[22] Filed: Sept. 10, 1971

[21] Appl. No.: 179,444

[52] U.S. Cl. .................................. 64/13, 64/12
[51] Int. Cl. .............................. F16d 3/78
[58] Field of Search .............. 64/13, 12, 11 R, 64/19

[56] References Cited
UNITED STATES PATENTS

| | | | |
|---|---|---|---|
| 1,947,052 | 2/1934 | Lack | 64/13 |
| 1,360,555 | 11/1920 | MacDonald | 64/13 |
| 1,466,238 | 8/1923 | MacDonald | 64/13 |
| 1,145,602 | 7/1915 | Lieber | 64/13 |
| 1,894,175 | 1/1933 | Hemeon | 64/13 |
| 2,532,755 | 12/1950 | Bloomfield | 64/12 |

Primary Examiner—Manuel A. Antonakas
Assistant Examiner—Randall Heald
Attorney—Karl F. Ross

[57] ABSTRACT

A flexible coupling comprises at least two metallic rings of polygonal outline whose corners all are coplanar and alternately connected to the opposite shafts and whose sides are curved (bowed) at least partially out of the plane of the corners, the other corners being connected together. An elastomer such as rubber can be bonded between the two rings at the sides and rigid spacers are provided at the corners between the rings. Clamping bodies overlie the rings at the corners and, like the spacers, have edges running transverse to the longitudinal axes of the respective sides which are rounded for best bending of the sides. The rings can be S-shaped at their sides or the sides can arch away from each other while being of reduced width in the central regions of the sides. In addition each ring can be made of a plurality of side members joined to the neighboring side members at the corners.

6 Claims, 9 Drawing Figures

Patented Sept. 18, 1973

Raoul Jörn
Peter Reichardt
INVENTORS.

BY

Karl F. Ross
ATTORNEY

Patented Sept. 18, 1973

Raoul Jörn
Peter Reichardt
INVENTORS.

BY

*Karl F. Ross*
ATTORNEY

COMPOSITE FLEXIBLE COUPLING FOR INTERCONNECTING TWO SHAFTS

FIELD OF THE INVENTION

The present invention relates to a flexible coupling for interconnecting two rotatable bodies. More specifically this invention relates to a flexible coupling for transmitting torque between two shafts which rotate about axes that are not necessarily in alignment or which may have some relative axial movement.

BACKGROUND OF THE INVENTION

Flexible coupling is used to compensate for angular and axial misalignment of shaft ends. A typical use is between the output shaft of an automotive-vehicle motor, e.g., the engine of a heave truck and the vehicle drive shaft, i.e., the cardan or universal joint shaft, with the flexible coupling compensating for the misalignments due to displacement of the motor on its mounts or movements of the chassis suspension during travel.

It is of course necessary that such a coupling be as rotationally stiff as possible in order to transmit torque with the least possible amount of losses and at the same time such a coupling must be able to flex without offering appreciable resistance to compensate for misalignment. A common type of such coupling is one made of rubber or a similar elastomer with a fabric reinforcement. The fabric is coated with rubber and then vulcanized into the coupling body. The coupling thus made cannot transmit large amounts of torque without tearing, since at best rubber and cloth cannot be given great strength. In addition it has been necessary to dimension such a coupling so large that it presents a balance problem on a rapidly rotating shaft.

Another solution has been the provision of a laminated element comprising a stack of sheet-metal rings of polygonal shape with alternate corners joined to the opposite shafts. The rings are planar and, although they offer excellent torque-transmission characteristics, they tend to flex only with great difficulty. Excessive misalignment of the shafts, in addition, with such a coupling is often capable of breaking the rings, for they have virtually no capacity for elongation between the attachment points.

OBJECTS OF THE INVENTION

It is therefore an object of the present invention to provide an improved flexible coupling for interconnecting two rotatable bodies.

Another object is the provision of such a coupling which is simple in design but which transmits torque efficiently while compensating for substantial misalignment of the rotation axes of the two bodies.

SUMMARY OF THE INVENTION

The above objects are attained according to the present invention by a coupling comprising at least one annular resilient sheet-metal element having a generally polygonal outline and a plurality of corners and a corresponding number of sides between the corners. The corners of each element are alternately connected to the rotating bodies and normally lie in a common plane. The sides, however, are curved or bowed at least partially out of the plane, having, for example, a U- or S-shape.

Such a coupling is advantageous in that it can deform to make up for relatively important angular misalignments of the shaft as, for example, on radial distortion of the drive shaft while transmitting torque with excellent efficiency.

According to other features of this invention a plurality of such elements or rings are used. One can be bowed in one axial direction and the other in the opposite, or the two can run parallel to each other. It is possible for best detuning (vibration damping) of the two shafts to fill the region between the rings with an elastomer; the elastomer also serves, when bonded to the rings, as a stiffness-increasing means. To this end, and according to a further feature of this invention, spacers of a rigid synthetic-resin or of a metal are provided between the rings at the corners of the polygons and clampnng bodies are provided to the outside of the stack. Both these bodies and these spacers have edges extending transverse to the longitudinal axes of the sides of the coupling. These sides are rounded, in the case of the spacers they are rounded on both faces and in the dase of the clamping bodies they are bent up to present a curved underside to the respective ring. Such rounding prevents the rings from breaking on flexing as could be the case were they perfectly square. These sides can extend at right angles to the polygon sides or, in the case where angular misalignment of the shafts is a particular problem, along respective radii of the polygon center.

DESCRIPTION OF THE DRAWING

The above and other objects, features, and advantages will become apparent from the following description, reference being made to the accompanying drawing in which.

SPECIFIC DESCRIPTION

Figure 1:
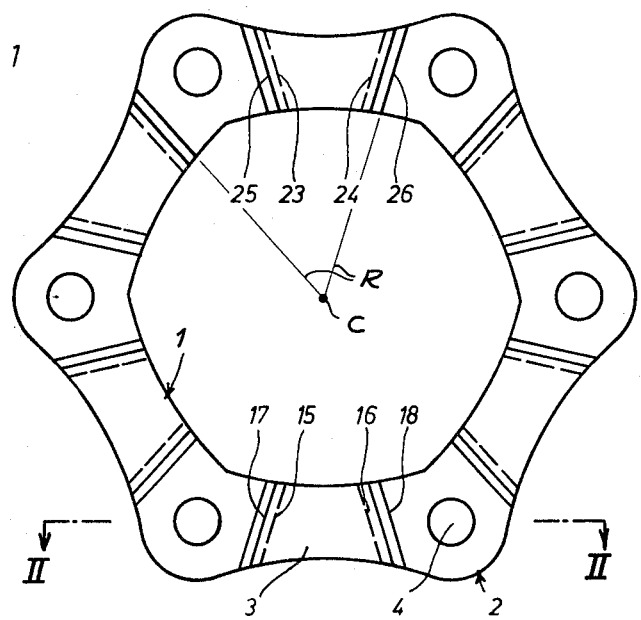
FIG. 1 is a top view of a coupling according to the present invention.
Figure 2:
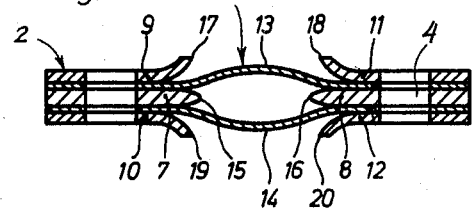
FIG. 2 is a sectional view taken along line II—II of FIG.1.

As seen in FIGS. 1 and 2 a coupling comprises a pair of spring-steel sheet-metal rings 1 of generally hexagonal shape, having corners 2 formed with bores 4 and sides 3 extending between these corners. The sides 3 are of reduced width, as seen in FIG. 1, in their central regions 13 and 14 which has been found to reduce the resistance to bending of the coupling while having no effect on its service life since the sides 3 are subjected mainly to longitudinal stresses in their central regions.

FIG. 2 shows how two such rings 1 are held apart by metal spacers 7 and 8 having edges 15 and 16 rounded off on both sides. These edges 15 and 16 lie on radii as shown at R extending from the center C of the polygonal rings 1. To each side of the sandwich formed by the rings 1 and spacers 7 and 8 at the corners 2 are metal clamping bodies 9–12 having edges 17–20 which are turned away from the rings and lie also along radii R. The two rings 1 are curved away from each other in the central regions 13 of their sides 3.

Figure 3:
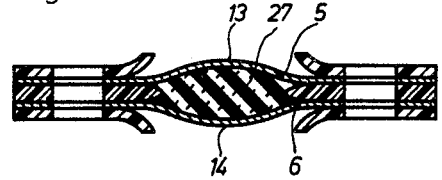
FIGS. 3–6 are sectional views similar to that of FIG. 2 showing alternate embodiments of the present invention.

In FIG. 3 substantially the same structure is shown, but the gap between th central regions 13 and 14 is filled with an elastomer that is tightly bonded by vulcanization to the rings 1 on both sides and the clamping bodies and spours are made of a hard synthetic resin, here Nylon.

Figure 4:
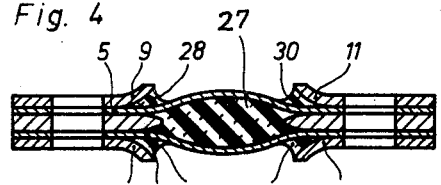
Figure 6:
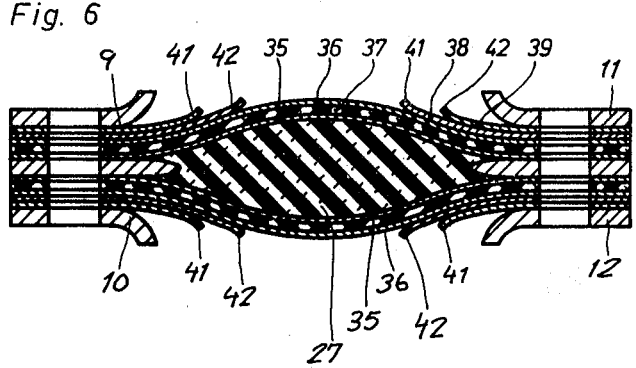

In FIG. 4 once again the same structure as in FIGS. 1—4 is used, but here even regions 28–31 under the edges of the clamp bodies 9–12 are filled also with rubber.

Figure 5:
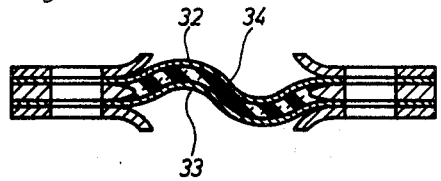

FIG. 5 illustrates a side of a coupling useful in conditions wherein relatively great rigidity and strength is required. To this end instead of one ring 1 a pair of similar rings 35 and 36 are provided with the space between them also also filled with an elastomer 37. The elastomeric body 37 extends all the way between the two rings 35 and 36, unlike the body 27. In addition extra leafspring 41 and 42, the former on top of and shorter than the latter, are provided to each side between the spring member 35–37 and its clamp body. The use of such extra shorter spring elements, between which a layer of bonded-in-place elastomer can also be provided, is discussed in the commonly assigned and co-pending patent application Ser. No. 132,981 filed by Raoul Jörn, one of the coinventors in the instant case, on 12 Apr. 1971 under the title COMPOSITE SPRING ELEMENT FOR USE AS A MOTOR MOUNT. Wherever provided, the rubber body can be of the fabric, wire or cord reinforced type and is bonded to the rings by vulcanization or cement.

Figure 7:
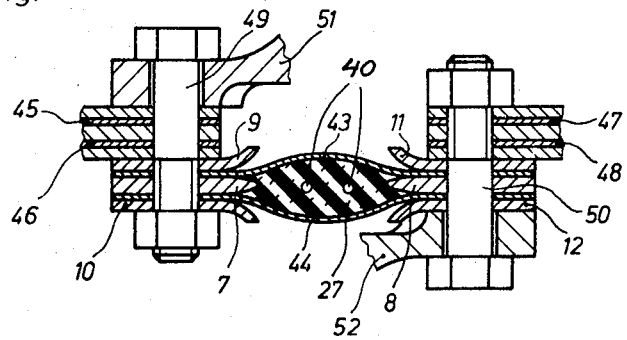
FIG. 7 is a sectional view of a portion of a further embodiment of the coupling according to the present invention showing its installation between two rotatable bodies.

FIG. 7 shows how instead of a single ring 1 a plurality of side members 43, 45, and 47 or 44, 46, and 48 can be combined by joining at the corners to form a flexible coupling according to the present invention. Each side element is provided with a bonded-in elastomeric body 27 which can be prvvided with holes 40 for best detuning of the two shafts which are connected to them by means of bolts 29 and 50 through their respective flanges 51 and 52. In all other respects each side element is constructed identically as each side of the embodiment of FIG. 3. Such an arrangement is extremely advantageous in that the stamping machine, etc. needed to produce it can be of very limited size, making it possible to produce many different flexible couplings of varied dimensions in a limited amount of space. Once bolted together such couplings are jsut as effective as the above-described unitary arrangements. The increase in thickness is of minor importance since the coupling according to the present invention is of such extremely reduced thickness in any case that even when doubled it presents no difficulty.

Figure 8:
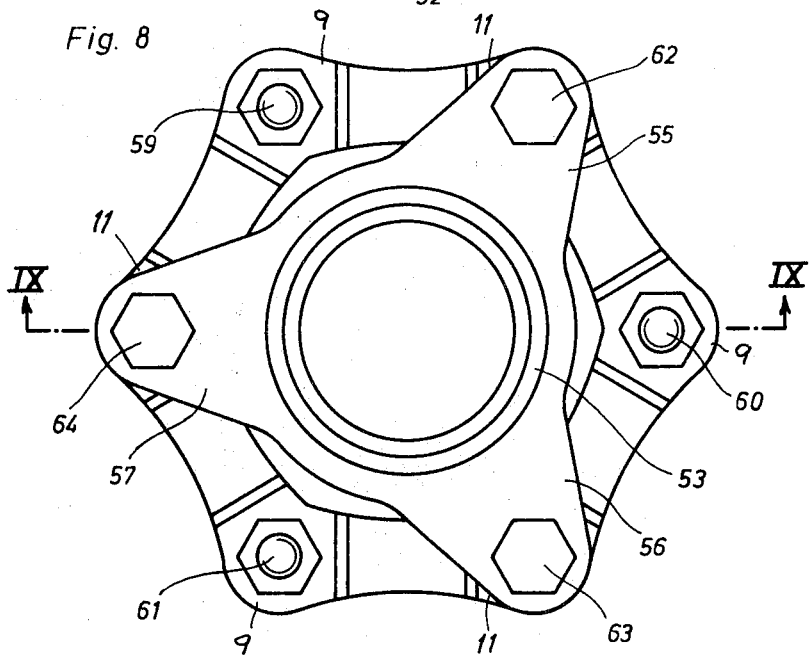
FIG. 8 is an end sectional view showing the installation of yet another embodiment of the present invention.
Figure 9:
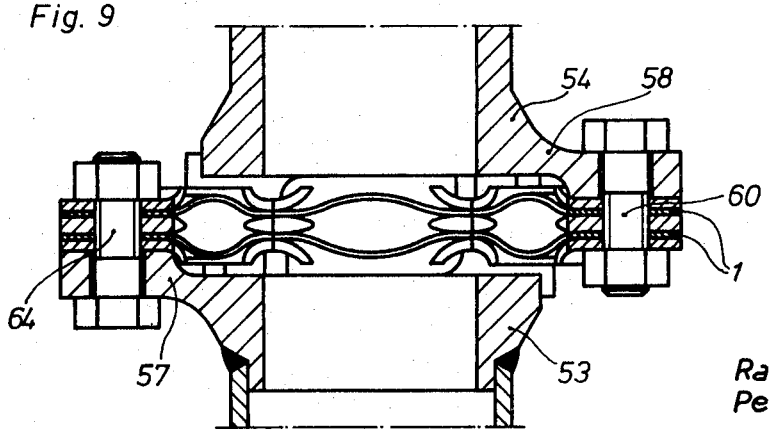
FIG. 9 is a sectional view taken along line IX—IX of FIG. 8.

FIGS. 8 and 9 show an arrangement which is essentially identical to that of FIG. 1 except that the various edges of the spacers and clamping bodies 9 and 11 extend at right angles to the respective axes of the adjoining sides of the polygonal ring 1. Two shafts 53 and 54 are shown with the flanges 55–57 of the former held by bolts 62–64 to alternate corners of the coupling while bolts 59–61 are fastened to the other shaft, one flange 58 of which is visible in FIG. 9.

It is worth noting that the flexible coupling according to the present invention is so remarkably resistant to the type of misalignment wherein the rotation axes of the two rotatable bodies remain parallel but out of line that bearins for centering the shafts can often be dispensed with to at least one side of the coupling. Angular misalignment, wherein the rotation axes are nonparallel but intersect however, is now resisted to any harmful extent by the coupling of the present invention.

We claim:

1. A flexible coupling for interconnecting two rotatable bodies, said coupling comprising at least two resilient sheet-metal rings of generally polygonal outline and having each a plurality of corners and a corresponding number of sides extending between said corners, said corners of each ring being alternately connected to said rotatable bodies and normally lying in a common plane, said sides normally being curved at least partially out of said plane, the corners of said rings lying in parallel planes; at least one spacer between said rings at each of said corners; a clamping body overlying each of said rings at each of said corners, each of said rings being sandwiched at each of said corners between a respective clamping body and a respective spacer, said spacers and said clamping bodies having respective rounded edges extending transverse to the longitudinal axis of the respective side; and an elastomeric body between the edge of each of said clamping bodies and its respective ring.

2. The coupling defined in claim 1 wherein each of said rings is curved at each of said sides away from the respective side of the other ring.

3. The coupling defined in claim 1 wherein said rings are formed substantially S-shaped at said sides.

4. The coupling defined in claim 1 wherein each of said rings is constituted by a plurality of side members each forming one of said sides and each connected to the neighboring side members at said corners.

5. A flexible coupling for interconnecting two rotatable members, said coupling comprising:
   at least two substantially coextensive resilient sheet metal polygon rings having corners and sides connecting said corners;
   means connecting said rings together at said corners, the sides of said rings between said corners being bowed symmetrically away from the opposing side of the other ring;
   a body of elastomeric material filling the space between each pair of outwardly bowed opposing sides; and
   means for connecting alternate corners to one of said members and the other corners to the other of said members.

6. A flexible coupling for interconnecting two rotatable members, said coupling comprising:
   at leawt two substantially coextensive resilient sheet metal polygon rings having corners and sides connecting said corners;
   means connecting said rings together at said corners, the sides of said rings between said corners being bowed symmetrically away from the opposing side of the other ring;
   a body of elastomeric material filling the space between each pair of outwardly bowed opposing sides.
   Rigid spacers received between said rings at each of said corners, the bodies of elastomeric material extending between each of said pair of sides from a spacer in one corner and terminating at the spacer at the opposite corner;

a respective clamping body at each of said corners overlying the respective ring and of a width equal to that of the respective ring, each clamping body having an outwardly turned lip along the respective side and curving away therefrom, said clamping body sandwiching said rings and spacers at each of said corners between the respective clamping bodies and rings and having an outwardly bent portion of a width equal to that of the respective ring and overlying same, said outwardly turned portions terminating in edges extending generally radially with respect to the axis of rotation of the coupling; and means for connecting alternate corners to one of said members and the other corners to the other end of said members.

* * * * *